US012567978B2

(12) United States Patent
      Hu

(10) Patent No.: US 12,567,978 B2
(45) Date of Patent: Mar. 3, 2026

(54) INTELLIGENT SEAL MOLD DEVICE HAVING MULTIFUNCTIONAL AREAS AND METHOD FOR GENERATING IMAGE OF SEAL MOLD HAVING MULTIFUNCTIONAL AREAS

(71) Applicant: Jinqian Hu, Hangzhou (CN)

(72) Inventor: Jinqian Hu, Hangzhou (CN)

( * ) Notice: Subject to any disclaimer, the term of this patent is extended or adjusted under 35 U.S.C. 154(b) by 37 days.

(21) Appl. No.: 18/723,089

(22) PCT Filed: Nov. 30, 2022

(86) PCT No.: PCT/CN2022/135381
      § 371 (c)(1),
      (2) Date: Jun. 21, 2024

(87) PCT Pub. No.: WO2023/116375
      PCT Pub. Date: Jun. 29, 2023

(65) Prior Publication Data
      US 2025/0055701 A1      Feb. 13, 2025

(30) Foreign Application Priority Data
      Dec. 22, 2021    (CN) .......................... 202111608065.0

(51) Int. Cl.
      *H04L 9/32*          (2006.01)
      *B41K 1/04*          (2006.01)
      *B41K 1/52*          (2006.01)
(52) U.S. Cl.
      CPC .............. *H04L 9/3247* (2013.01); *B41K 1/04* (2013.01); *B41K 1/52* (2013.01); *H04L 9/32* (2013.01)

(58) Field of Classification Search
      CPC .......... H04L 9/3247; H04L 9/32; Y02P 90/30; B41K 1/04; B41K 1/36; B41K 1/52
      See application file for complete search history.

(56) References Cited

U.S. PATENT DOCUMENTS

| | | | |
|---|---|---|---|
| 7,805,610 B2 * | 9/2010 | Lapstun | ............. H04N 1/00204 713/168 |
| 7,877,606 B2 * | 1/2011 | Lapstun | ................ G06F 16/955 713/168 |

(Continued)

FOREIGN PATENT DOCUMENTS

| | | |
|---|---|---|
| CN | 1159041 A | 9/1997 |
| CN | 202443481 U | 9/2012 |

(Continued)

*Primary Examiner* — Azizul Choudhury

(57) ABSTRACT

Disclosed are an intelligent seal mold device having multifunctional areas and a method for generating an image of a seal mold having multifunctional areas, the intelligent seal mold device having multifunctional areas including a seal housing, a seal mold having multifunctional areas, a distributed ink tank, a storage module, and a selection module. The seal mold having multifunctional areas includes a plurality of functional areas; the distributed ink tank includes a plurality of ink grooves; the storage module stores a comparison table and a plurality of pieces of functional data of a registered user; and the selection module selects the number of functional areas of the seal mold having multifunctional areas, etc., according to a selection instruction. After being authorized, the registered user is permitted to invoke an image of the seal mold having multifunctional areas to complete digital sealing.

16 Claims, 5 Drawing Sheets

(56) References Cited

U.S. PATENT DOCUMENTS

| | | | | |
|---|---|---|---|---|
| 10,628,092 B1 * | 4/2020 | Dickinson | ............. | G06F 3/1288 |
| 11,004,282 B1 * | 5/2021 | Bajaj | ...................... | G07C 9/257 |
| 11,238,512 B1 * | 2/2022 | Baioumy | ........... | G06Q 30/0621 |
| 2015/0095999 A1 * | 4/2015 | Toth | ...................... | H04L 9/3263 |
| | | | | 726/6 |
| 2017/0305589 A1 * | 10/2017 | Yuyama | ................... | B65B 35/14 |
| 2018/0293673 A1 * | 10/2018 | Ortiz Obando | ........ | G06Q 50/04 |
| 2018/0350180 A1 * | 12/2018 | Onischuk | ............... | G07C 13/00 |
| 2019/0342085 A1 * | 11/2019 | Kube | .................... | H04L 9/3247 |
| 2020/0322351 A1 * | 10/2020 | Jadav | ................. | H04W 12/106 |
| 2022/0070330 A1 * | 3/2022 | Speasl | ................ | H04N 1/00244 |
| 2022/0138447 A1 * | 5/2022 | Feldman | ................ | A61B 5/117 |
| | | | | 235/380 |
| 2022/0198077 A1 * | 6/2022 | Mora | ...................... | G06Q 50/04 |
| 2022/0353074 A1 * | 11/2022 | Goodman | ............. | H04L 9/3234 |
| 2024/0386422 A1 * | 11/2024 | Peters | ................ | H04L 63/0442 |

FOREIGN PATENT DOCUMENTS

| | | |
|---|---|---|
| CN | 108108611 A | 6/2018 |
| CN | 112257110 A | 1/2021 |
| CN | 113032767 A | 6/2021 |
| CN | 114312070 A | 4/2022 |
| JP | 2006127009 A | 5/2006 |

* cited by examiner

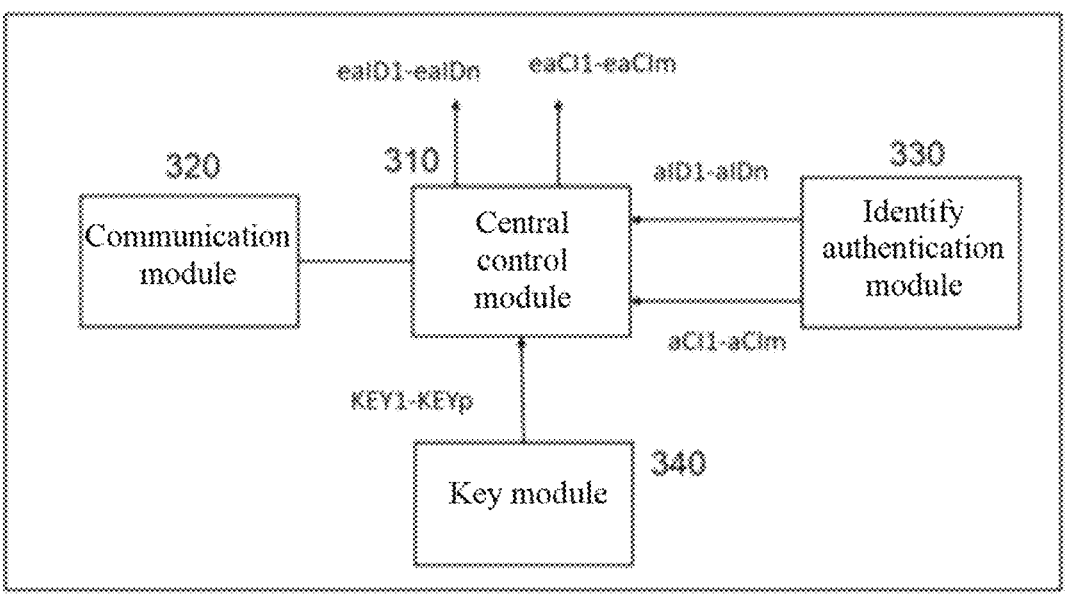

FIG. 3

| Function | Functional data of registered user | Ink color data | |
|---|---|---|---|
| Electronic signature | Electronic signature data FDA1<br>Electronic signature data FDB1 | Black | 40 |
| Electronic personal seal | Electronic personal seal data FDA2<br>Electronic personal seal data FDB2 | Red | |
| Fingerprint | Fingerprint data FDA3<br>Fingerprint data FDB3 | Red | |
| Electronic enterprise official seal | Electronic official seal data FDA4<br>Electronic official seal data FDB4 | Red | |
| Invoice seal | Invoice seal data FDA5<br>Invoice seal data FDB5 | Blue | |
| Contract seal | Contract seal data FDA6<br>Contract seal data FDB6 | Blue | |

FIG. 4

Provide an intelligent seal mold device having multifunctional areas | S610

Use the storage module to store a comparison table and a plurality of pieces of functional data of a registered user, the comparison table including a plurality of functions, the plurality of pieces of functional data of the registered user, and a plurality of pieces of ink color data corresponding thereto | S620

Use the selection module to select, according to a selection instruction, the number of functional areas of the seal mold having multifunctional areas, a plurality of functions of the functional areas, the plurality of pieces of functional data of the registered user and the plurality of pieces of ink color data corresponding thereto, and generate an image of the seal mold having multifunctional areas | S630

Permit the registered user, after being authorized, to invoke the image of the seal mold having multifunctional areas to complete digital sealing | S640

FIG. 6

Acquire a plurality of pieces of identity information, a plurality of corporate information, and a plurality of digital certificates corresponding thereto of a company owner of the corporate user | S710

Physically or digitally authenticate the plurality of pieces of identity information and the plurality of pieces of corporate information of the corporate user according to the plurality of digital certificates, and generate a plurality of pieces of authenticated identity information and a plurality of pieces of authenticated corporate information | S720

Generate an electronic signature, a fingerprint, an electronic personal seal, an electronic corporate official seal, an invoice seal and/or a contract seal of the corporate user according to the plurality of pieces of authenticated identity information and the plurality of pieces of authenticated corporate information of the corporate user | S730

Use the storage module to store the plurality of pieces of identity information, the plurality of pieces of corporate information, the plurality of digital certificates, the plurality of pieces of authenticated identity information, and the plurality of pieces of authenticated corporate information of the corporate user | S740

FIG. 7

Provide a central control module, and a communication module, an identity authentication module, and a key module connected to the central control module    S810

Use the communication module to realize communication between the intelligent seal mold device having multifunctional areas and an external server    S820

Use the identity authentication module to authenticate biometric identification data inputted by the registered user, and authorize the registered user after a successful authentication    S830

Use the key module to store a plurality of keys, and encrypt the plurality of pieces of authenticated identity information according to corresponding keys in the plurality of keys, to generate a plurality of pieces of encrypted authenticated identity information and a plurality of pieces of encrypted authenticated corporate information    S840

Use the central control module to receive inputs and control the operation of other modules, permit the family member of the individual user or the legally authorized representative of the corporate user, after being authorized, to invoke the image of the seal mold having multifunctional areas to complete digital sealing    S850

FIG. 8

INTELLIGENT SEAL MOLD DEVICE HAVING MULTIFUNCTIONAL AREAS AND METHOD FOR GENERATING IMAGE OF SEAL MOLD HAVING MULTIFUNCTIONAL AREAS

CROSS-REFERENCE TO RELATED APPLICATIONS

This application is a continuation of PCT/CN2022/135381, filed Nov. 30, 2022 and claims priority of Chinese Patent Application No. 202111608065.0, filed on Dec. 22, 2021, the entire contents of which are incorporated herein by reference.

TECHNICAL FIELD

The present disclosure relates to the technical field of intelligent seals, and specifically to a seal mold device and a method for generating a seal mold image.

BACKGROUND

A single conventional physical seal has been able to provide a variety of ink colors, but, at present, the intelligent seal commercially available can only provide a single ink color (such as red or blue), and can only invoke a seal mold having a single function (such as electronic signatures or fingerprints) every time. If a user needs to invoke a number of seal molds with different functions, it is required to repeat sealing several times, which is inconvenient to use. In addition, if the electronic signatures and fingerprints are presented in the same color using red ink, the red electronic signature will bring users a bad and discomfort impression.

Accordingly, there is an urgent need for those skilled in the art to develop an intelligent seal mold device having multifunctional areas capable of presenting multiple ink colors and multiple functions simultaneously in a single intelligent seal mold image.

It is to be noted that the above description of the technical background is merely for a clear and complete description of the technical solutions of the present disclosure and for facilitating understanding by those skilled in the art. It is not to be assumed that the above technical solutions are known to those skilled in the art merely because they are set forth in the background of the present disclosure.

SUMMARY

To overcome the deficiencies in the prior art, the embodiments of the present disclosure provide an intelligent seal mold device having multifunctional areas and a method for generating an image of a seal mold having multifunctional areas.

The embodiments of the present application provide an intelligent seal mold device having multifunctional areas, including a seal housing, and a seal mold having multifunctional areas, a distributed ink tank, a storage module, and a selection module arranged inside the seal housing. The seal mold having multifunctional areas includes a plurality of functional areas, with each of which corresponding to a different function. The distributed ink tank includes a plurality of ink grooves, with each of which holding a different color of ink. The storage module is configured to store a comparison table and a plurality of pieces of functional data of a registered user, the comparison table including a plurality of functions, the plurality of pieces of functional data of the registered user and a plurality of pieces of corresponding ink color data. The selection module is configured to select, according to a selection instruction, the number of the functional areas of the seal mold having multifunctional areas, a plurality of functions of the functional areas, the plurality of pieces of functional data of the registered user and the plurality of pieces of ink color data corresponding thereto, and generate an image of a seal mold having multifunctional areas. After being authorized, the registered user is permitted to invoke the image of the seal mold having multifunctional areas to complete digital sealing.

Further, the plurality of pieces of ink color data include black, red, blue, green, and yellow.

Further, the registered user includes an individual user, and the plurality of functions include an electronic signature, an electronic personal seal, and/or a fingerprint.

Further, the intelligent seal mold having multifunctional areas includes an acquisition module, an information authentication module, and a functional data generation module. The acquisition module is configured to acquire a plurality of pieces of identity information and a plurality of digital certificates corresponding thereto of the individual user. The information authentication module is configured to physically or digitally authenticate the plurality of pieces of identity information of the individual user according to the plurality of digital certificates, and generate a plurality of pieces of authenticated identity information. The functional data generation module is configured to generate an electronic signature, a fingerprint and/or an electronic personal seal of the individual user according to the plurality of pieces of authenticated identity information of the individual user. After being authorized, a family member of the individual user is permitted to invoke the image of the seal mold having multifunctional areas to complete digital sealing.

Further, the registered user includes a corporate user, and the plurality of functions include an electronic signature, an electronic personal seal, a fingerprint, an electronic corporate official seal, an invoice seal, and/or a contract seal.

Further, the intelligent seal mold having multifunctional areas includes an acquisition module, an information authentication module, and a functional data generation module. The acquisition module is configured to acquire a plurality of pieces of identity information, a plurality of pieces of corporate information, and a plurality of digital certificates corresponding thereto of a company owner of the corporate user. The information authentication module is configured to physically or digitally authenticate the plurality of pieces of identity information and the plurality of pieces of corporate information of the corporate user according to the plurality of digital certificates, and generate a plurality of pieces of authenticated identity information and a plurality of pieces of authenticated corporate information. The functional data generation module is configured to generate an electronic signature, a fingerprint, an electronic personal seal, an electronic corporate official seal, an invoice seal and/or a contract seal of the corporate user according to the plurality of pieces of authenticated identity information and the plurality of pieces of authenticated corporate information of the corporate user. After being authorized, a legally authorized representative of the corporate user is permitted to invoke the image of the seal mold having multifunctional areas to complete digital sealing.

Further, the plurality of pieces of corporate information include a binding bank account number, an electronic business license, tax control information, an official seal number, a legal person identify number, a social credit code and/or an electronic certificate number of the corporate user authorized by a banking system and/or a government system.

Further, the plurality of pieces of identity information include biometric characteristic information, identity card information, telephone number information, personal seal information, social security information, credit information and/or personal photo information of the registered user.

Further, the intelligent seal mold device having multifunctional areas includes a central control module, and a communication module, an identity authentication module, and a key module connected to the central control module. The communication module is configured to realize communication between an intelligent seal mold device having multifunctional areas and an external server. The identity authentication module is configured to authenticate biometric identification data inputted by the registered user, and authorize the registered user after a successful authentication. The key module is configured to store a plurality of keys and encrypt the plurality of pieces of authenticated identity information and the plurality of pieces of authenticated corporate information according to corresponding keys in the plurality of keys, to generate a plurality of pieces of encrypted authenticated identity information and a plurality of pieces of encrypted authenticated corporate information. The central control module is configured to receive inputs and control the operation of other modules, and permit a family member, after being authorized, of the individual user to invoke the image of the seal mold having multifunctional areas to complete digital sealing.

A method for generating an image of a seal mold having multifunctional areas is further disclosed in the embodiments of the present disclosure, which is applied to a seal mold device having multifunctional areas, and the following steps are included:

providing an intelligent seal mold device having multifunctional areas, the intelligent seal mold device having multifunctional areas including a seal housing, and a seal mold having multifunctional areas, a distributed ink tank, a storage module and a selection module arranged inside the seal housing, the seal mold having multifunctional areas including a plurality of functional areas, with each of which corresponding to a different function, and the distributed ink tank including a plurality of ink grooves, with each of which holding a different color of ink;

using the storage module to store a comparison table and a plurality of pieces of functional data of a registered user, the comparison table including a plurality of functions, the plurality of pieces of functional data of the registered user, and a plurality of pieces of ink color data corresponding thereto;

using the selection module to select, according to a selection instruction, the number of the functional areas of the seal mold having multifunctional areas, a plurality of functions of the functional areas, the plurality of pieces of functional data of the registered user and the plurality of pieces of ink color data corresponding thereto, and generating an image of the seal mold having multifunctional areas; and permitting the registered user, after being authorized, to invoke the image of the seal mold having multifunctional areas to complete digital sealing.

By employing the above technical solutions, the present disclosure has the following beneficial effects over the prior art. According to the intelligent seal mold device having multifunctional areas and the method for generating an image of a seal mold having multifunctional areas provided by the present disclosure, by presenting multiple ink colors and multiple functions simultaneously in the multifunctional areas of a single intelligent seal mold image, the user only needs to seal once to invoke the image of the seal mold having multifunctional areas to complete digital sealing, without repeating sealing several times, which brings the user an easier, more convenient, and time-saving experience. Furthermore, each function has a corresponding ink color, such as, black ink for electronic signature, red ink for electronic seal, red ink for fingerprints, and blue ink for invoice seal, to avoid the discomfort caused by only one ink color. In addition, the intelligent seal mold device having multifunctional areas and the method for generating an image of a seal mold having multifunctional areas of the present disclosure have no limitations on the number of functional areas and the number of registered users on the image of the seal mold having multifunctional areas, and the location, size, and shape of the functional areas can be arbitrarily changed and adjusted, so that the need of different combinations can be easily satisfied.

BRIEF DESCRIPTION OF THE DRAWINGS

FIG. 3 is a frame diagram of multi-modules of FIGS. 1 and 2.

FIG. 4 is a schematic diagram of a comparison table.

FIG. 6 is a flow chart of a method for generating an image of an intelligent seal mold having multifunctional areas in the first embodiment of the present disclosure.

FIG. 7 is a flow chart of a method for generating an image of an intelligent seal mold having multifunctional areas in the second embodiment of the present disclosure.

FIG. 8 is a flow chart of a method for generating an image of an intelligent seal mold having multifunctional areas in a third embodiment of the present disclosure.

Figure 1:
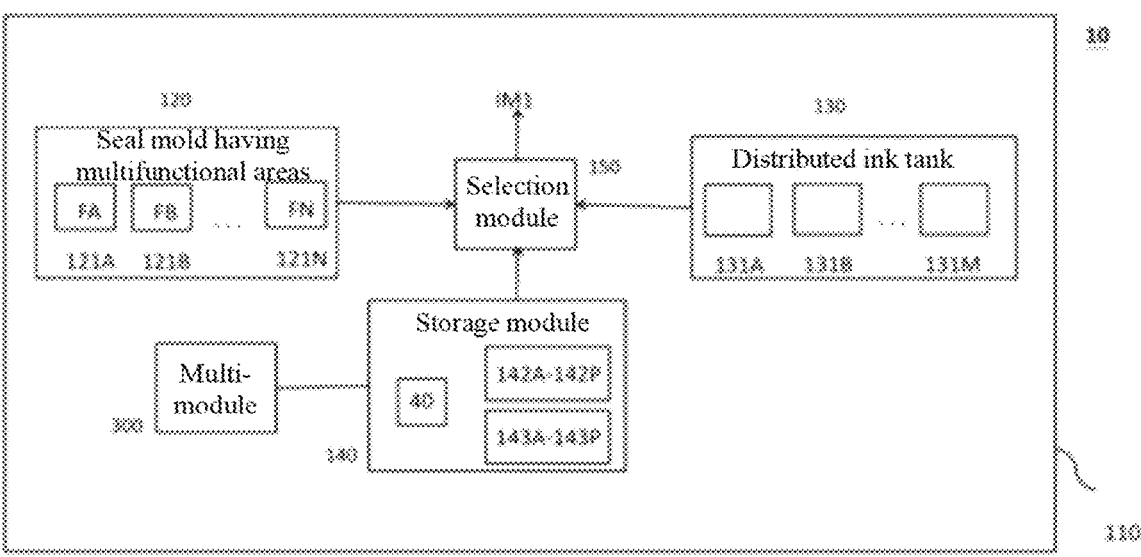
FIG. 1 is a frame diagram of an intelligent seal mold device having multifunctional areas in a first embodiment of the present disclosure.

Reference numerals and denotations thereof:

10/20—intelligent seal mold device having multifunctional areas; 110—seal housing; 120—seal mold having multifunctional areas; 130—distributed ink tank; 140—storage module; 150—selection module; 210—acquisition module; 220—information authentication module; 230—functional data generation module; 300—multi-module; 310—central control module; 320—communication module; 330—identity authentication module; 340—key module; 40—comparison table; 121A-121N—functional areas; FA-FN—functions; 131A-131M—ink grooves; 142A-142P—functional data; 143A-143P—ink color data; IM1—image of the seal mold having multifunctional areas; ID1-IDn—identity information; aID1-aIDn—authenticated identity information; eaID1-eaTDn—encrypted authenticated identity information; DS1-DSn—digital certificate; CI1-CIm—corporate information; aCI1-aCIm—authenticated corporate information; eaCI1-eaCIm—encrypted authenticated corporate information; KEY1-KEYp—keys; FDA1 and FDB1—electronic signature data; FDA2 and FDB2—electronic personal seal data; FDA3 and FDB3—fingerprint data; FDA4 and FDB4—electronic corporate official seal data; FDA5 and FDB5—invoice seal data; FDA6 and FDB6—contract seal data; and S610-S640, S710-S740, and S810-S850—steps.

DETAILED DESCRIPTION

To make the above and other objectives, features and advantages of the present disclosure more obvious and easy to understand, preferred embodiments are given in the following, and are described by reference to the accompanying drawings.

To state the technical solutions of the embodiments in the present disclosure or the prior art clearer, the accompanying drawings needed in the description of the embodiments or prior art are stated briefly below. Obviously, the drawings described below are some embodiments of the present disclosure, and for those ordinary skilled in the art, other drawings can be obtained according to these drawings without creative efforts.

The technical solutions of the embodiments in the present disclosure will be described clearly and completely by reference to the accompanying drawings of the embodiments in the present disclosure below. Obviously, the embodiments described are only some, rather than all embodiments of the present disclosure. On the basis of the embodiments of the present disclosure, all other embodiments obtained by those ordinary skilled in the art without creative efforts fall within the scope of protection of the present disclosure.

It is to be noted that, in the description of the present disclosure, the terms "first", "second", and the like are only used to describe the objective and distinguish similar objects, and there is no order of precedence between them, nor can they be understood as indicating or implying relative importance. Furthermore, in the description of the present disclosure, unless otherwise indicated, "plurality" means two or more.

As shown in FIG. 1, which is a frame diagram of an intelligent seal mold device having multifunctional areas 10 in a first embodiment of the present disclosure, the intelligent seal mold device having multifunctional areas 10 includes a seal housing 110, and a seal mold having multifunctional areas 120, a distributed ink tank 130, a storage module 140, a selection module 150, and a multi-module 300 arranged inside the seal housing 110. The seal mold having multifunctional areas 120 includes a plurality of functional areas 121A-121N, with each of which corresponding to a different function FA-FN. The distributed ink tank 130 includes a plurality of ink grooves 131A-131M, with each of which holding a different color of ink. The storage module 140 is configured to store a comparison table 40 and a plurality of pieces of functional data 142A-142P of a registered user, the comparison table 40 including a plurality of functions FA-FN, the plurality of pieces of functional data 142A-142P of the registered user and a plurality of pieces of corresponding ink color data 143A-143P. The selection module 150 is coupled to the seal mold having multifunctional areas 120, the distributed ink tank 130, and the storage module 140, and is configured to select, according to a selection instruction, the number of functional areas of the seal mold having multifunctional areas 120, a plurality of functions FA-FN of the plurality of functional areas 121A-121N, and the plurality of pieces of functional data 142A-142P of the registered user and a plurality of pieces of ink color data 143A-143P corresponding thereto, and generate an image of the seal mold having multifunctional areas IM1. The seal mold having multifunctional areas 120, the distributed ink tank 130, the storage module 140, the selection module 150, and the multi-module 300 are arranged inside the seal housing 110. After being authorized, the registered user is permitted to invoke the image of the seal mold having multifunctional areas IM to complete digital sealing.

It is to be noted that the plurality of pieces of ink color data 143A-143P may include black, red, blue, green, and yellow, but this is not a limitation to the present disclosure, and other ink colors may be included according to actual needs.

In an embodiment, the registered user may be an individual user, and the plurality of functions FA-FN may include an electronic signature, a fingerprint, and/or an electronic personal seal. In another embodiment, the registered user may be a corporate user, and the plurality of functions FA-FN may include an electronic signature, a fingerprint, an electronic personal seal, an electronic corporate official seal, an invoice seal, and/or a contract seal. This is only an example, and the plurality functions FA-FN may include other functions.

In other embodiments, the intelligent seal mold device having multifunctional areas 10 of the present disclosure may be extended to permit all members of a family or all legally authorized representatives of a corporate to invoke the image of the seal mold having multifunctional areas IM1 to complete digital sealing. For example, there are three members in a family: father, mother, and child; and if the father is an individual registered user, and electronic signatures, fingerprints, and/or electronic personal seals of the father, the mother, and the child are all stored in the storage module 140 and authenticated as well as authorized, not only the father (the registered user), but also the mother and the child can invoke all family members' electronic signatures, fingerprints and/or electronic personal seals. Similarly, in addition to a legal representative (a corporate registered user), a corporate has multiple other legally authorized representatives (such as, general manager, legal responsible person, and financial responsible person); and if electronic signatures, fingerprints, electronic personal seals, electronic corporate official seals, special seals for invoices and/or contract seals of the legal representative and other legally authorized representatives are all stored in the storage module 140 and are authenticated as well as authorized, not only the legal representative (the corporate registered user), but also the multiple other legally authorized representatives can invoke the corporate's electronic signatures, fingerprints, electronic personal seals, electronic corporate official seals, special seals for invoices and/or contract seals.

It is worth noting that the electronic signatures here may include Chinese electronic signatures, and electronic signatures of different foreign languages. Generally, an electronic signature mold can be made on the basis of a handwritten signature by a user, with the electronic signature looking consistent with the user's handwritten signature. The electronic signatures and fingerprints usually are different in colors. For example, the electronic signatures are generally black or blue, and the fingerprints are generally red.

Figure 2:
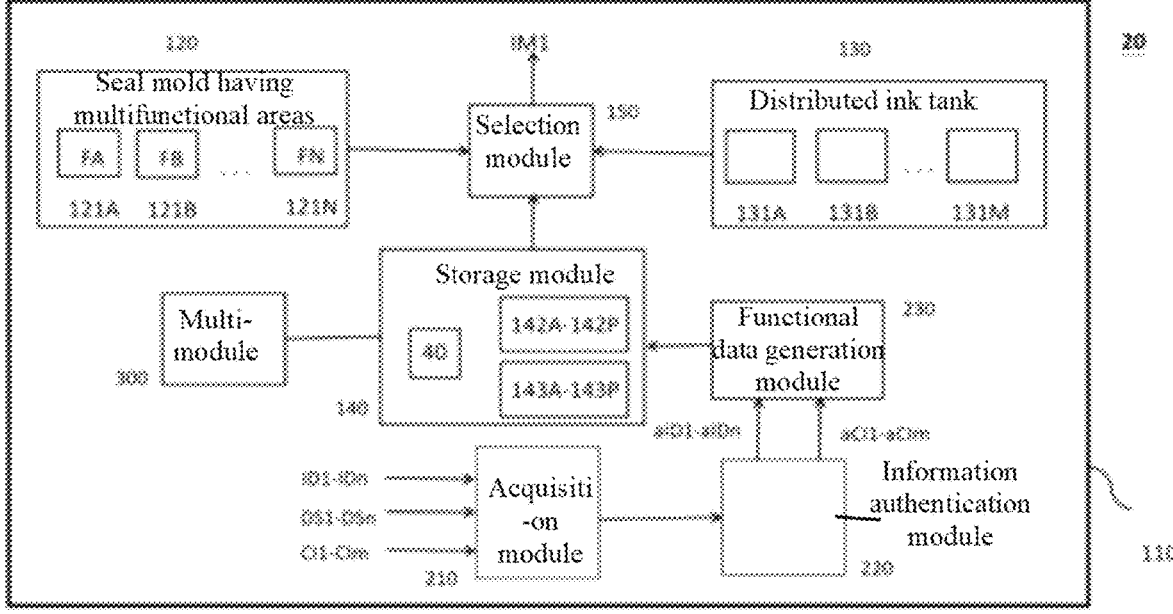
FIG. 2 is a frame diagram of an intelligent seal mold device having multifunctional areas in a second embodiment of the present disclosure.

As shown in FIG. 2, which is a frame diagram of an intelligent seal mold device having multifunctional areas 20 in a second embodiment of the present disclosure, the intelligent seal mold device having multifunctional areas 20 of FIG. 2 is similar to the intelligent seal mold device having multifunctional areas 10 of FIG. 1, with the difference being that the intelligent seal mold device having multifunctional areas 20 of FIG. 2 further includes: an acquisition module 210, an information authentication module 220, and a functional data generation module 230.

If the registered user is an individual user, the acquisition module 210 acquires a plurality of pieces of identity information ID1-IDn and a plurality of digital certificates DS1-DSn corresponding thereto of the individual user; the information authentication module 220 is configured to physically or digitally authenticate the plurality of pieces of identity information ID1-IDn of the individual user according to the plurality of digital certificates DS1-DSn, and generate a plurality of pieces of authenticated identity information aID1-aIDn; and the functional data generation module 230 generates an electronic signature, a fingerprint and/or an electronic personal seal of the individual user according to the plurality of pieces of authenticated identity information aID1-aIDn of the individual user. At this time, the storage module 140 further stores the plurality of pieces of identity information ID1-IDn, the plurality of digital certificates DS1-DSn and the plurality of pieces of authenticated identity information aID1-aIDn of the individual user.

If the registered user is a corporate user, the acquisition module 210 acquires a plurality of pieces of identity information ID1-IDn, a plurality of pieces of corporate information CI1-CIm, and a plurality of digital certificates DS1-DSn corresponding thereto of a company owner of the corporate user; the information authentication module 220 is configured to physically or digitally authenticate the plurality of pieces of identity information ID1-IDn and the plurality of pieces of corporate information CI1-CIm of the corporate user according to the plurality of digital certificates DS1-DSn, and generate a plurality of pieces of authenticated identity information aID1-aIDn and a plurality of pieces of authenticated corporate information aCI1-aCIm; and the functional data generation module 230 generates an electronic signature, a fingerprint, an electronic personal seal, an electronic corporate official seal, an invoice seal and/or a contract seal of the corporate user according to the plurality of pieces of authenticated identity information aID1-aIDn and the plurality of pieces of authenticated corporate information aCI1-aCIm of the corporate user. At this time, the storage module 140 further stores the plurality of pieces of identity information ID1-IDn, the plurality of pieces of corporate information CI1-CIm, the plurality of digital certificates DC1-DCn, the plurality of pieces of authenticated identity information aID1-aIDn, and the plurality of pieces of authenticated corporate information aCI1-aCIm of the corporate user.

It is to be noted that the plurality of pieces of identity information may include biometric characteristic information, identity card information, telephone number information, personal seal information, social security information, credit information and/or personal photo information of the registered user. The plurality of pieces of corporate information CI1-CIm may include a binding bank account number, an electronic business license, tax control information, an official seal number, a legal person identify number, a social credit code and/or an electronic certificate number of the corporate user authorized by a banking system and/or a government system, but the present disclosure is not limited to this.

As shown in FIG. 3, which is a frame diagram of multi-modules of FIGS. 1 and 2, the multi-module 300 includes: a central control module 310, and a communication module 320, an identity authentication module 330, and a key module 340 connected to the central control module 310. The communication module 320 is configured to realize communication between an intelligent seal mold device having multifunctional areas 10/20 and an external server. The identity authentication module 330 is configured to authenticate biometric identification data inputted by the registered user, and authorize the registered user after a successful authentication. The key module is configured to store a plurality of keys KEY1-KEYp and encrypt the plurality of pieces of authenticated identity information aID1-aIDn and the plurality of pieces of authenticated corporate information aCI1-aCIm according to corresponding keys in the plurality of keys KEY1-KEYp, to generate a plurality of pieces of encrypted authenticated identity information eaID1-eaIDn and a plurality of pieces of encrypted authenticated corporate information eaCI1-eaCIm. The central control module 310 receives inputs and controls the operation of other modules, and permits the registered user, after being authorized, to invoke the image of the seal mold having multifunctional areas IM1 to complete digital sealing.

As shown in FIG. 4, a schematic diagram of an example of a comparison table 40, the comparison table 40 includes a plurality of functions, the plurality of pieces of functional data of the registered user, and a plurality of pieces of corresponding ink color data. As mentioned above, the plurality of functions may include an electronic signature, an electronic personal seal, a fingerprint, an electronic corporate official seal, an invoice seal, and/or a contract seal. For example, the ink color data corresponding to the electronic signature is black, the ink color data corresponding to the electronic personal seal is red, the ink color data corresponding to the fingerprint is red, the ink color data corresponding to the electronic corporate official seal is red, the ink color data corresponding to the invoice seal is blue, and the ink color data corresponding to the contract seal is blue. This is only an example, rather than a limitation to the present disclosure, and the ink color of each function can be adjusted according to actual needs.

It is to be noted that upon the registered user inputs a selection instruction through a user interface, the selection module 150 selects, according to the selection instruction, the number of functional areas of the seal mold having multifunctional areas 120, a plurality of functions FA-FN of functional areas, and the plurality of pieces of functional data 142A-142P of the registered user and the plurality of pieces of ink color data 143A-143P corresponding thereto, and generates the image of the seal mold having multifunctional areas IM1.

Figure 5A:
FIG. 5A is a schematic diagram of an electronic signature and an electronic personal seal as examples of an image of a seal mold having multifunctional areas.
Figure 5B:
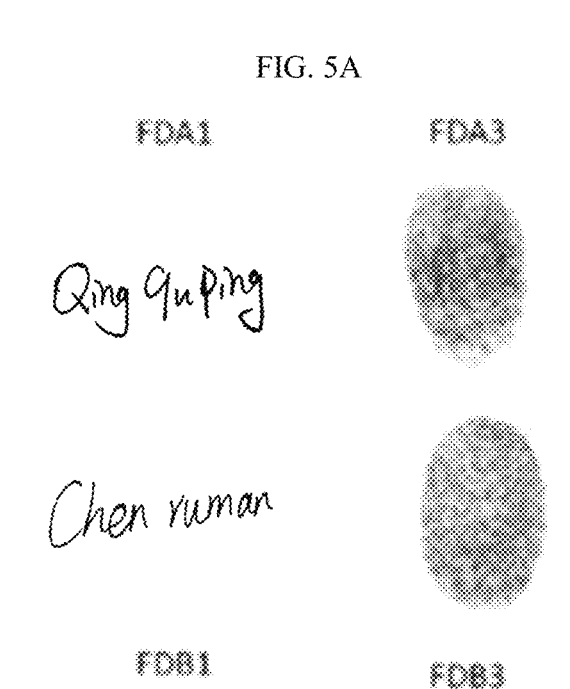
FIG. 5B is a schematic diagram of an electronic signature and a fingerprint as examples of the image of a seal mold having multifunctional areas.
Figure 5C:
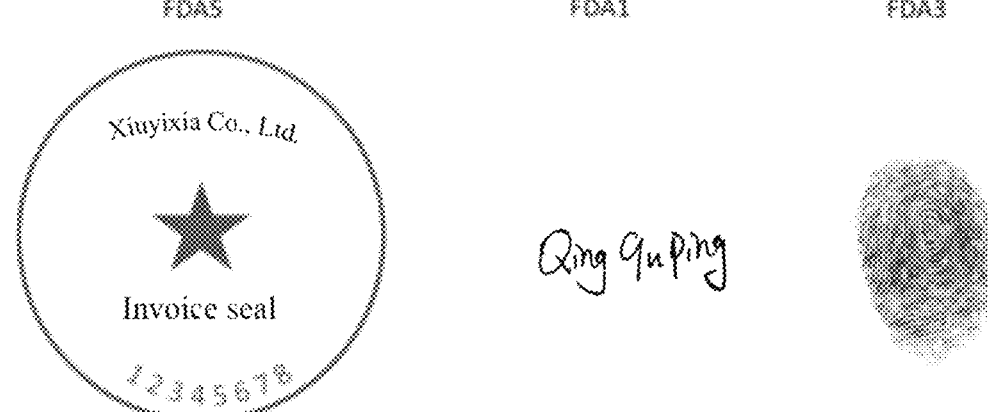
FIG. 5C is a schematic diagram of an invoice seal, an electronic signature and a fingerprint as examples of the image of a seal mold having multifunctional areas.

FIGS. 5A-5C are schematic diagrams of examples of an image of the seal mold having multifunctional areas. In FIG. 5A, there are two functional areas; functions of the functional areas include an electronic signature and an electronic personal seal; functional data of a registered user A includes electronic signature data FDA1 and electronic personal seal data FDA2; an ink color used for the electronic signature data FDA1 is black, and an ink color used for the electronic personal seal data FDA2 is red; and the generated images of the seal mold having multifunctional areas IM1 are shown in FIG. 5A. In FIG. 5B, there are two functional areas; functions of the functional areas include an electronic signature and a fingerprint; functional data of a registered user A includes electronic signature data FDA1 and fingerprint data FDA3, and functional data of a registered user B includes electronic signature data FDB1 and fingerprint data FDB3;

ink colors for the electronic signature data FDA1 and FDB1 are black, and ink colors for the fingerprint data FDA3 and FDB3 are red; and the generated images of the seal mold having multifunctional areas IM1 are shown in FIG. 5B. In FIG. 5C, there are three functional areas; functions of the functional areas include an invoice seal, an electronic signature and a fingerprint; functional data of a registered user A includes invoice seal data FDA4, electronic signature data FDA1, and fingerprint data FDA2; an ink color for the invoice seal data FDA5 is blue, an ink color for the electronic signature data FDA1 is black, and an ink color for the fingerprint data FDA2 is red; and the generated images of the seal mold having multifunctional areas IM1 are shown in FIG. 5C.

In other words, there is no limit to the number of functional areas and the number of registered users, which can be adjusted according to actual needs. In addition, the location, size and shape of the functional areas can be changed at will. For example, in FIG. 5C, the order of the location of the functional areas is, from left to right, invoice seal, electronic signature, and fingerprint, which can be changed to electronic signature, fingerprint, and invoice seal. The size of the functional data in FIG. 5C is different from that in FIG. 5A and FIG. 5B.

As shown in FIGS. 1 and 6, FIG. 6 is a flow chart of a method for generating an image of an intelligent seal mold having multifunctional areas in the first embodiment of the present disclosure. The method in FIG. 6 includes the following steps.

In step S610, an intelligent seal mold device having multifunctional areas is provided, the intelligent seal mold device having multifunctional areas including a seal housing, and a seal mold having multifunctional areas, a distributed ink tank, a storage module and a selection module arranged inside the seal housing, the seal mold having multifunctional areas including a plurality of functional areas, with each of which corresponding to a different function, and the distributed ink tank including a plurality of ink grooves, with each of which holding a different color of ink.

In step S620, the storage module is used to store a comparison table and a plurality of pieces of functional data of a registered user, the comparison table including a plurality of functions, the plurality of pieces of functional data of the registered user, and a plurality of pieces of ink color data corresponding thereto.

In step S630, the selection module is used to select, according to a selection instruction, the number of functional areas of the seal mold having multifunctional areas, a plurality of functions of functional areas, the plurality of pieces of functional data of the registered user and the plurality of pieces of ink color data corresponding thereto, and generate an image of the seal mold having multifunctional areas.

In step S640, after being authorized, the registered user is permitted to invoke the image of the seal mold having multifunctional areas to complete digital sealing.

It is to be noted that step S620 is performed by the storage module 140 and step S630 is performed by the selection module 150.

As shown in FIGS. 2 and 7, FIG. 7 is a flow chart of a method for generating an image of an intelligent seal mold having multifunctional areas in the second embodiment of the present disclosure. The method in FIG. 7 includes the following steps.

In step S710, a plurality of pieces of identity information, a plurality of corporate information, and a plurality of digital certificates corresponding thereto of a registered corporate user are acquired.

In step S720, according to the plurality of digital certificates, the plurality of pieces of identity information and the plurality of pieces of corporate information of the corporate user are physically or digitally authenticated, and a plurality of pieces of authenticated identity information and a plurality of pieces of authenticated corporate information are generated.

In step S730, an electronic signature, a fingerprint, an electronic personal seal, an electronic corporate official seal, an invoice seal and/or a contract seal of the corporate user are generated according to the plurality of pieces of authenticated identity information and the plurality of pieces of authenticated corporate information of the corporate user.

In step S740, the storage module is used to store the plurality of pieces of identity information, the plurality of pieces of corporate information, the plurality of digital certificates, the plurality of pieces of authenticated identity information, and the plurality of pieces of authenticated corporate information of the corporate user.

It is to be noted that step S710 is performed by the acquisition module 210, step S720 is performed by the information authentication module 220, step S730 is performed by the functional data generation module 230, and step S740 is performed by the storage module 140.

As shown in FIGS. 3 and 8, FIG. 8 is a flow chart of a method for generating an image of an intelligent seal mold having multifunctional areas in a third embodiment of the present disclosure. The method in FIG. 8 includes the following steps.

In step S810, a central control module, and a communication module, an identity authentication module, and a key module connected to the central control module are provided.

In step S820, the communication module is used to realize communication between the intelligent seal mold device having multifunctional areas and an external server.

In step S830, the identity authentication module is used to authenticate biometric identification data inputted by the registered user, and authorize the registered user after a successful authentication.

In step S840, the key module is used to store a plurality of keys and encrypt the plurality of pieces of authenticated identity information and the plurality of pieces of authenticated corporate information according to corresponding keys in the plurality of keys, to generate a plurality of pieces of encrypted authenticated identity information and a plurality of pieces of encrypted authenticated corporate information.

In step S850, the central control module is used to receive inputs and control the operation of other modules, and permit the registered user, after being authorized, to invoke the image of the seal mold having multifunctional areas to complete digital. Specifically, a family member of the individual user or a legally authorized representative of the corporate user, after being authorized, is permitted to invoke the image of the seal mold having multifunctional areas to complete digital sealing.

It is to be noted that step S820 is performed by the communication module 320, step S830 is performed by the identify authentication module 330, step S840 is performed by the key module 340, and step S850 is performed by the central control module 310.

The specific embodiments of the present disclosure provide the method for generating an image of a seal mold having multifunctional areas, and the intelligent seal mold device having multifunctional areas. By presenting multiple ink colors and multiple functions simultaneously in the multifunctional areas of an image of a single intelligent seal mold, the user only needs to seal once to invoke the image of the seal mold having multifunctional areas to complete digital sealing, which brings the user an easier, more convenient, and time-saving experience. Furthermore, each function has a corresponding ink color, avoiding the discomfort caused by only one ink color. The intelligent seal mold device having multifunctional areas and the method for generating an image of a seal mold having multifunctional areas of the present disclosure have no limitations on the number of functional areas and the number of registered users on the image of the seal mold having multifunctional areas, and the location, size, and shape of the functional areas can be arbitrarily changed and adjusted, so that the needs of different combinations can be easily satisfied. The intelligent seal mold device having multifunctional areas of the present disclosure can achieve the same function as the conventional physical seal mold, and can also be applied to all types of seals, electronic signatures, fingerprints and so on. In addition, the intelligent seal mold device having multifunctional areas 10 of the present disclosure can not only permit the registered user after being authorized to invoke the image of the seal mold having multifunctional areas to complete digital sealing, but also be extended to permit all members of a family or all legally authorized representatives of a corporate to invoke the image of the seal mold having multifunctional areas IM1 to complete digital sealing.

The embodiments of the present disclosure described above may be implemented in a variety of hardware, software codes, or combinations thereof. For example, the embodiments of the present disclosure may be program code for performing the method described above in a data signal processor (DSP). The present disclosure may relate to a variety of functions performed by a computer processor, a digital signal processor, a microprocessor, or a field programmable gate array (FPGA). The processor described above may be configured to perform specific tasks in accordance with the present disclosure, which are accomplished by executing machine-readable software code or firmware code that define specific methods disclosed herein. The software code or firmware code may be developed into different programming languages and different formats or forms, and may be the compiled software code for different target platforms. However, the different code styles, types and languages of software code for performing tasks according to the present disclosure and other types of configuration code do not depart from the spirit and scope of the present disclosure.

The intelligent seal mold device having multifunctional areas of the present disclosure stores digital certificates and keys in a chip of a physical-electronic integrated intelligent electronic seal instead of a public platform, with a high private and security. All the information is stored in the form of electronic keys, which is invoked according to actual needs, greatly enhancing the security of the digital certificates and the keys.

By employing the above technical solutions, the present disclosure has the following beneficial effects over the prior art. According to the intelligent seal mold device having multifunctional areas and the method for generating an image of a seal mold having multifunctional areas provided by the present disclosure, by presenting multiple ink colors and multiple functions simultaneously in the multifunctional areas of an image of a single intelligent seal mold, the user only needs to seal once to invoke the image of the seal mold having multifunctional areas to complete digital sealing, without repeating sealing several times, which brings the user an easier, more convenient, and time-saving experience. Furthermore, each function has a corresponding ink color, for example, black ink for electronic signature, red ink for electronic seal, red ink for fingerprints, and blue ink for invoice seal, to avoid the discomfort caused by only one ink color. In addition, the intelligent seal mold device having multifunctional areas and the method for generating an image of a seal mold having multifunctional areas of the present disclosure have no limitations on the number of functional areas and the number of registered users on the image of the seal mold having multifunctional areas, and the location, size, and shape of the functional areas can be arbitrarily changed and adjusted, so that the needs of different combinations can be easily satisfied.

The specific embodiments are applied herein to elaborate on the concept and implementation of the present disclosure. The above description of the embodiments is merely used for helping understand the method and core idea of the present disclosure. At the same time, on the basis of the idea of the present disclosure, changes may be made in the specific implementation and the scope of application by those of ordinary skilled in the art. In summary, the contents of this specification are not to be construed as a limitation of the present disclosure

The invention claimed is:

1. An intelligent seal mold device having multifunctional areas, comprising: a seal housing, a seal mold having multifunctional areas, the seal mold having multifunctional areas comprising a plurality of functional areas, with each of which corresponding to a different function, a distributed ink tank, the distributed ink tank comprising a plurality of ink grooves, with each of which holding a different color of ink, a storage module, configured to store a comparison table and a plurality of pieces of functional data of a registered user, the comparison table comprising a plurality of functions, the plurality of pieces of functional data of the registered user and a plurality of pieces of ink color data corresponding thereto, and a selection module, coupled to the seal mold having multifunctional areas, the distributed ink tank, and the storage module, and configured to select, according to a selection instruction, the number of functional areas of the seal mold having multifunctional areas, a plurality of functions of functional areas, the plurality of pieces of functional data of the registered user and the plurality of pieces of ink color data corresponding thereto, and generate an image of the seal mold having multifunctional areas, wherein the seal mold having multifunctional areas, the distributed ink tank, the storage module, and the selection module are arranged inside the seal housing; after being authorized, the registered user is permitted to invoke the image of the seal mold having multifunctional areas to complete digital sealing; a multi-module, the multi-module comprising: a central control module, and a communication module, an identity authentication module, and a key module connected to the central control module, wherein the communication module is configured to realize communication between an intelligent seal mold device having multifunctional areas and an external server; the identity authentication module is configured to authenticate biometric identification data inputted by the registered user, and authorize the registered user after a successful authentication; the key module is configured to store a plurality of keys, and encrypt the plurality of pieces of authenticated identity information according to corresponding keys in the plurality of keys, to generate a plurality of pieces of encrypted authenticated identity information; and the central control module is configured to receive inputs and control the operation of other modules, and permit a family member, after being authorized, of an individual user to invoke the image of the seal mold having multifunctional areas to complete digital sealing.

2. The intelligent seal mold device having multifunctional areas according to claim 1, wherein the plurality of pieces of ink color data comprise black, red, blue, green, and yellow.

3. The intelligent seal mold device having multifunctional areas according to claim 1, wherein the registered user comprises an individual user, and the plurality of functions comprise an electronic signature, an electronic personal seal, and/or a fingerprint.

4. The intelligent seal mold device having multifunctional areas according to claim 3, further comprising:

an acquisition module, configured to acquire a plurality of pieces of identity information and a plurality of digital certificates corresponding thereto of the individual user, an information authentication module, configured to physically or digitally authenticate the plurality of pieces of identity information of the individual user according to the plurality of digital certificates, and generate a plurality of pieces of authenticated identity information, and a functional data generation module, configured to generate an electronic signature, a fingerprint and/or an electronic personal seal of the individual user according to the plurality of pieces of authenticated identity information of the individual user, wherein the storage module further stores the plurality of pieces of identity information, the plurality of digital certificates and the plurality of pieces of authenticated identity information of the individual user; and after being authorized, a family member of the individual user is permitted to invoke the image of the seal mold having multifunctional areas to complete digital sealing.

5. The intelligent seal mold device having multifunctional areas according to claim 4, wherein the plurality of pieces of identity information comprise biometric characteristic information, identity card information, telephone number information, personal seal information, social security information, credit information and/or personal photo information of the registered user.

6. The intelligent seal mold device having multifunctional areas according to claim 1, wherein the registered user comprises a corporate user, and the plurality of functions comprise an electronic signature, an electronic personal seal, a fingerprint, an electronic corporate official seal, an invoice seal, and/or a contract seal.

7. The intelligent seal mold device having multifunctional areas according to claim 6, further comprising:

an acquisition module, configured to acquire a plurality of pieces of identity information, a plurality of pieces of corporate information, and a plurality of digital certificates corresponding thereto of a company owner of the corporate user, an information authentication module, configured to physically or digitally authenticate the plurality of pieces of identity information and the plurality of pieces of corporate information of the corporate user according to the plurality of digital certificates, and generate a plurality of pieces of authenticated identity information and a plurality of pieces of authenticated corporate information, and a functional data generation module, configured to generate an electronic signature, a fingerprint, an electronic personal seal, an electronic corporate official seal, an invoice seal and/or a contract seal of the corporate user according to the plurality of pieces of authenticated identity information of the corporate user and the plurality of pieces of authenticated corporate information, wherein the storage module further stores the plurality of pieces of identity information, the plurality of pieces of corporate information, the plurality of digital certificates, the plurality of pieces of authenticated identity information, and the plurality of pieces of authenticated corporate information of the corporate user; and after being authorized, a legally authorized representative of the corporate user is permitted to invoke the image of the seal mold having multifunctional areas to complete digital sealing.

8. The intelligent seal mold device having multifunctional areas according to claim 7, wherein the plurality of pieces of identity information comprise biometric characteristic information, identity card information, telephone number information, personal seal information, social security information, credit information and/or personal photo information of the registered user.

9. The intelligent seal mold device having multifunctional areas according to claim 7, further comprising a multi-module, the multi-module comprising:

the key module, configured to store a plurality of keys, and encrypt the plurality of pieces of authenticated identity information and the plurality of pieces of authenticated corporate information according to corresponding keys in the plurality of keys, to generate a plurality of pieces of encrypted authenticated identity information and a plurality of pieces of encrypted authenticated corporate information; and the central control module, configured to receive inputs and control the operation of other modules, and permit the legally authorized representative, after being authorized, of the corporate user to invoke the image of the seal mold having multifunctional areas to complete digital sealing.

10. The intelligent seal mold device having multifunctional areas according to claim 7, wherein the plurality of pieces of corporate information comprise a binding bank account number, an electronic business license, tax control information, an official seal number, a legal person identify number, a social credit code and/or an electronic certificate number of the corporate user authorized by a banking system and/or a government system.

11. A method for generating an image of a seal mold having multifunctional areas, applied to a seal mold device having multifunctional areas, comprising the following steps: providing an intelligent seal mold device having multifunctional areas, the intelligent seal mold device having multifunctional areas comprising a seal housing, and a seal mold having multifunctional areas, a distributed ink tank, a storage module and a selection module arranged inside the seal housing, wherein the seal mold having multifunctional areas comprises a plurality of functional areas, with each of which corresponding to a different function, and the distributed ink tank comprises a plurality of ink grooves, with each of which holding a different color of ink; using the storage module to store a comparison table and a plurality of pieces of functional data of a registered user, the comparison table comprising a plurality of functions, the plurality of pieces of functional data of the registered user, and a plurality of pieces of ink color data corresponding thereto; using the selection module to select, according to a selection instruction, the number of functional areas of the seal mold having multifunctional areas, a plurality of functions of the functional areas, the plurality of pieces of functional data of the registered user and the plurality of pieces of ink color data corresponding thereto, and generating an image of the seal mold having multifunctional areas; permitting the registered user, after being authorized, to invoke the image of the seal mold having multifunctional areas to complete digital sealing; providing a central control module, and a communication module, an identity authentication module, and a key module connected to the central control module; using the communication module to realize communication between the intelligent seal mold device having multifunctional areas and an external server; using the identity authentication module to authenticate biometric identification data inputted by the registered user, and authorize the registered user after a successful authentication; using the key module to store a plurality of keys, and encrypt the plurality of pieces of authenticated identity information according to corresponding keys in the plurality of keys, to generate a plurality of pieces of encrypted authenticated identity information; and using the central control module to receive inputs and control the operation of other modules, and permit a family member, after being authorized, of an individual user to invoke the image of the seal mold having multifunctional areas to complete digital sealing.

12. The method according to claim 11, wherein the registered user comprises an individual user, and the plurality of functions comprise an electronic signature, an electronic personal seal, and/or a fingerprint.

13. The method according to claim 12, further comprising:

acquiring a plurality of pieces of identity information and a plurality of digital certificates corresponding thereto of the individual user;

physically or digitally authenticating the plurality of pieces of identity information of the individual user according to the plurality of digital certificates, and generating a plurality of pieces of authenticated identity information;

generating an electronic signature, a fingerprint and/or an electronic personal seal of the individual user according to the plurality of pieces of authenticated identity information of the individual user;

using the storage module to store the plurality of pieces of identity information, the plurality of digital certificates and the plurality of pieces of authenticated identity information of the individual user; and permitting a family member, after being authorized, of the individual user to invoke the image of the seal mold having multifunctional areas to complete digital sealing.

14. The method according to claim 11, wherein the registered user comprises a corporate user, and the plurality of functions comprise an electronic signature, an electronic personal seal, a fingerprint, an electronic corporate official seal, an invoice seal, and/or a contract seal.

15. The method according to claim 14, further comprising:

acquiring a plurality of pieces of identity information, a plurality of corporate information, and a plurality of digital certificates corresponding thereto of a company owner of the corporate user;

physically or digitally authenticating the plurality of pieces of identity information and the plurality of pieces of corporate information of the corporate user according to the plurality of digital certificates, and generating a plurality of pieces of authenticated identity information and a plurality of pieces of authenticated corporate information;

generating an electronic signature, a fingerprint, an electronic personal seal, an electronic corporate official seal, an invoice seal and/or a contract seal of the corporate user according to the plurality of pieces of authenticated identity information and the plurality of pieces of authenticated corporate information of the corporate user;

using the storage module to store the plurality of pieces of identity information, the plurality of pieces of corporate information, the plurality of digital certificates, the plurality of pieces of authenticated identity information, and the plurality of pieces of authenticated corporate information of the corporate user; and permitting a legally authorized representative, after being authorized, of the corporate user to invoke the image of the seal mold having multifunctional areas to complete digital sealing.

16. The method according to claim 15, further comprising:

using the key module to store a plurality of keys and encrypt the plurality of pieces of authenticated identity information and the plurality of pieces of authenticated corporate information according to corresponding keys in the plurality of keys, to generate a plurality of pieces of encrypted authenticated identity information and a plurality of pieces of encrypted authenticated corporate information; and using the central control module to receive inputs and control the operation of other modules, and permit the legally authorized representative, after being authorized, of the corporate user to invoke the image of the seal mold having multifunctional areas to complete digital sealing.

* * * * *